United States Patent
Reillo et al.

(10) Patent No.: US 10,343,067 B2
(45) Date of Patent: Jul. 9, 2019

(54) COMPUTER SYSTEM AND METHOD FOR SELECTING AND DISPLAYING IN-GAMING OPTIONS BASED ON USER SELECTION WEIGHT CRITERIA

(71) Applicant: KING.COM LIMITED, St. Julians (MT)

(72) Inventors: Robert Reillo, Stockholm (SE); Jonas Johansson, Stockholm (SE)

(73) Assignee: KING.COM LTD., St. Julians (MT)

( * ) Notice: Subject to any disclaimer, the term of this patent is extended or adjusted under 35 U.S.C. 154(b) by 463 days.

(21) Appl. No.: 14/580,461

(22) Filed: Dec. 23, 2014

(65) Prior Publication Data

US 2016/0175719 A1     Jun. 23, 2016

(51) Int. Cl.

| | | |
|---|---|---|
| G06F 3/0484 | (2013.01) | |
| G06F 17/30 | (2006.01) | |
| A63F 13/533 | (2014.01) | |
| A63F 13/79 | (2014.01) | |
| A63F 13/352 | (2014.01) | |
| G06F 3/048 | (2013.01) | |
| G06F 17/00 | (2019.01) | |

(52) U.S. Cl.
CPC .......... *A63F 13/533* (2014.09); *A63F 13/352* (2014.09); *A63F 13/79* (2014.09); *A63F 2300/535* (2013.01); *G06F 3/048* (2013.01); *G06F 17/00* (2013.01)

(58) Field of Classification Search
CPC . A63F 13/00; A63F 9/00; G07F 17/32; G07F 17/00; G06F 3/048; G06F 3/00
See application file for complete search history.

(56) References Cited

U.S. PATENT DOCUMENTS

| | | | | |
|---|---|---|---|---|
| 5,969,697 A * | 10/1999 | Tani | ................. | G06F 3/038 |
| | | | | 345/2.1 |
| 6,466,918 B1 * | 10/2002 | Spiegel | ............. | G06F 17/30873 |
| | | | | 705/27.1 |
| 6,828,992 B1 * | 12/2004 | Freeman | ................ | H04B 1/202 |
| | | | | 715/733 |
| 6,884,171 B2 * | 4/2005 | Eck | ......................... | A63F 13/12 |
| | | | | 463/42 |
| 7,295,995 B1 * | 11/2007 | York | ...................... | G06Q 30/02 |
| | | | | 705/26.8 |
| 7,983,401 B1 * | 7/2011 | Krinsky | ................ | H04M 3/527 |
| | | | | 379/88.23 |
| 9,375,636 B1 * | 6/2016 | Wakeford | ............... | A63F 13/00 |
| 9,666,029 B1 * | 5/2017 | Yu | ........................ | G07F 17/3255 |
| 2002/0128068 A1 * | 9/2002 | Randall Whitten | .... | A63F 13/10 |
| | | | | 463/43 |
| 2004/0053605 A1 * | 3/2004 | Martyn | ................. | G06F 3/0482 |
| | | | | 455/418 |

(Continued)

OTHER PUBLICATIONS

The Touching History of Touchscreen Tech, Christine Erickson, Nov. 9, 2012, mashable.com, pp. 1-7. (Year: 2012).*

*Primary Examiner* — Hugo Molina
(74) *Attorney, Agent, or Firm* — Saul Ewing Arnstein & Lehr LLP

(57) ABSTRACT

A computer system has at least one memory and at least one processor. The at least one memory stores one or more options. Each option is associated with a gaming application provided to a user device. Each option has a respective identifier and a respective weight. The at least one processor retrieves one or more of the options from the at least one memory. The weight provides a weighting for each option in dependence on previous selections of that option.

11 Claims, 12 Drawing Sheets

(56) References Cited

U.S. PATENT DOCUMENTS

| | | | | |
|---|---|---|---|---|
| 2004/0237051 | A1* | 11/2004 | Clauson | G06F 3/0482 715/825 |
| 2007/0270212 | A1* | 11/2007 | Cockerille | G06F 8/68 463/29 |
| 2008/0248845 | A1* | 10/2008 | Morgan | A63F 13/12 463/1 |
| 2008/0268943 | A1* | 10/2008 | Jacob | A63F 13/10 463/23 |
| 2010/0238131 | A1* | 9/2010 | Aoyagi | G06F 3/04842 345/173 |
| 2010/0323775 | A1* | 12/2010 | Stanley | A63F 13/12 463/2 |
| 2012/0264511 | A1* | 10/2012 | Marsland | H04L 67/38 463/31 |
| 2013/0029767 | A1* | 1/2013 | Boutin | A63F 13/71 463/42 |
| 2013/0123956 | A1* | 5/2013 | Fernandez | G07F 17/3225 700/91 |
| 2013/0316772 | A1* | 11/2013 | Kong | A63F 13/005 463/3 |
| 2014/0012652 | A1* | 1/2014 | Levin | G06Q 30/0233 705/14.31 |
| 2014/0051498 | A1* | 2/2014 | Bieler | A63F 13/12 463/25 |
| 2014/0171190 | A1* | 6/2014 | Diard | G06T 15/005 463/31 |
| 2015/0050996 | A1* | 2/2015 | Kharkar | A63F 13/75 463/31 |
| 2015/0127731 | A1* | 5/2015 | Hamada | H04L 67/22 709/204 |
| 2015/0231502 | A1* | 8/2015 | Allen | A61F 13/63 463/42 |

* cited by examiner

Figure 4a

| Option | context | Sub option IDs |
|---|---|---|
| ID 1 | (play) | a, b, c |
| ID 2 | (gift) | d, e, f |
| ID 3 | (invite to try) | g, h, i |

410

420

430

440

COMPUTER SYSTEM AND METHOD FOR SELECTING AND DISPLAYING IN-GAMING OPTIONS BASED ON USER SELECTION WEIGHT CRITERIA

FIELD OF THE INVENTION

Some embodiments relate to a computer system for use in playing a computer implemented game.

BACKGROUND OF THE INVENTION

One context where computer devices need to selectively communicate is in computer implemented so called "social" or "casual" gaming applications. Such games are popular, particularly when played against or with other players, either with direct local based wired or wireless connections between the devices of each user or player, or via a combination of such connections through a local or wide area network such as the internet.

SUMMARY OF THE INVENTION

According to an aspect, there is provided a computer system comprising: at least one memory storing one or more options, each option being associated with a gaming application provided to a user device, and each option having a respective identifier and a respective weight, and at least one processor configured to retrieve from the at least one memory one or more of the options, wherein the weight provides a weighting for each option in dependence on previous selections of that option, identified by the respective identifier, by one or more user devices.

At least one option may be associated with at least two further sub options, each of the sub options having a respective identifier.

A sub option may have its own sub options.

Each of the sub options may be provided with a respective weight.

The memory may comprise a database.

The computer system may be provided by a server and/or by a user device.

The weight of the sub options may be dependent on previous selections of the respective sub options by one or more user devices.

The at least one processor may be configured to select at least one sub option based on the weight associated with the sub option.

The memory may be configured to store the identifier of an option in association with respective identifiers of the respective plurality of sub options.

At least some of the sub options may comprise message data associated with a respective option for display by the user device.

The processor may be configured to use the weight to control displaying of information associated with a plurality of options.

The processor may be configured to use the weight to control the selection of at least one of the plurality of options.

According to another aspect, there is provided a computer system comprising: at least one database storing a plurality of options associated with a gaming application provided to user devices, each option having respective identifying information and a respective weight, and at least one processor configured to receive selection information from a plurality of user devices, the selection information having the respective identification information indication which one of the plurality of options have been selected by a user of the respective user device and to use the selection information to determine the weights.

According to a another aspect, there is provided a method for providing a computer implemented game in a user device, the method comprising: storing in at least one memory one or more options, each option being associated with a gaming application provided to a user device, and each option having a respective identifier and a respective weight; and retrieving from the at least one memory one or more of the options, wherein the weight provides a weighting for each option in dependence on previous selections of that option, identified by the respective identifier, by one or more user devices.

At least one option may be associated with at least two further sub options, each of the sub options having a respective identifier.

Each of the sub options may be provided with a respective weight.

The weight of the sub options may be dependent on previous selections of the respective sub options by one or more user devices.

The method may comprise selecting at least one sub option based on the weight associated with the sub option.

The method may comprise storing in the at least one memory store the identifier of an option in association with respective identifiers of the respective plurality of sub options.

At least some of the sub options may comprise message data associated with a respective option for display by the user device.

The method may comprise using the weight to control displaying of information associated with a plurality of options.

The method may comprise using the weight to control the selection of at least one of the plurality of options.

According to another aspect, there is provided a method for providing a computer implemented game in a user device, the method comprising: storing a plurality of options associated with a gaming application provided to user devices, each option having respective identifying information and a respective weight; receiving selection information from a plurality of user devices, the selection information having the respective identification information indication which one of the plurality of options have been selected by a user of the respective user device; and using the selection information to determine the weights.

According to an aspect, there is provided a computer system comprising: at least one memory storing one or more options, each option being associated with a gaming application provided to a user device, and each option having a respective identifier and a respective weight, and at least one processor configured to retrieve from the at least one memory one or more of the options in dependence on the weight.

According to an aspect, there is provided a computer system comprising: a plurality of servers, each server configured to provide a gaming application to a plurality of user devices; and a plurality of user devices, each user device being associated with a respective one of the servers, a user of a first user device being able to interact with another user of another user device, wherein the first user device and the another user device are configured to communicate with the same server of the plurality of servers when interacting.

The first user device may be provided by the same server with information about a plurality of potential other user devices with which the first user device is able to interact, each of the potential user devices being served by the same server as the first user device.

The user of the first user device may select one or more another user devices from the information.

The information may comprise a list of the plurality of potential other user devices.

In some embodiments, the same server may be configured to select the another user device with which the first user device is to interact.

The interaction between the user devices may comprise playing a computer implemented game.

BRIEF DESCRIPTION OF DRAWINGS

To understand some embodiments, reference will now be made by way of example only to the accompanying drawings, in which:

FIGS. 4a, 4b and 4c illustrate options, sub-options and example message data;

DETAILED DESCRIPTION OF SOME EMBODIMENTS

One application context where computer or consumer devices of users need to selectively communicate is in computer implemented so called "social" or "casual" gaming. Such games are popular, particularly when played against or with other players or users, either with direct local based wired or wireless connections between the computing devices of each player or user, or via a combination of such connections through a local or wide area network such as the Internet.

Some gaming applications may be incredibly popular with hundreds of millions of downloads and millions of users or players. Users of such casual games tend to play when convenient such as during a commute, travel or on a break or vacation. Hence, the average play session of a player may vary greatly across different games, and keeping a player engaged, even for a short time can be a challenge to a designer.

The inventors have recognised that different in-game options, offers, user interfaces and the like may influence such player engagement, but it can be difficult to analyse and quantify the success (or not) of such options. Many input factors may influence the selection, click-through or take up of an offer, such as language of the user, geographical/ regional differences, other sensitivities of a user, and the way the offer is worded or presented, what is offered, and so on.

Some embodiments may provide a technical system in which options individually tagged. In addition one or more options may have one or more sub options, each sub option being individually tagged. One or more option and/or sub option may be provided with different messaging. Each different messaging option may also have an individual tag. The tagging allows for the selections made by the user to be monitored. This information may be used to control which and/or how options are provided to the user. The information may be collected from a large number of users and used to control which and/or how options are provided. This may improve the interaction of a user with a computer implemented game.

Figure 1:
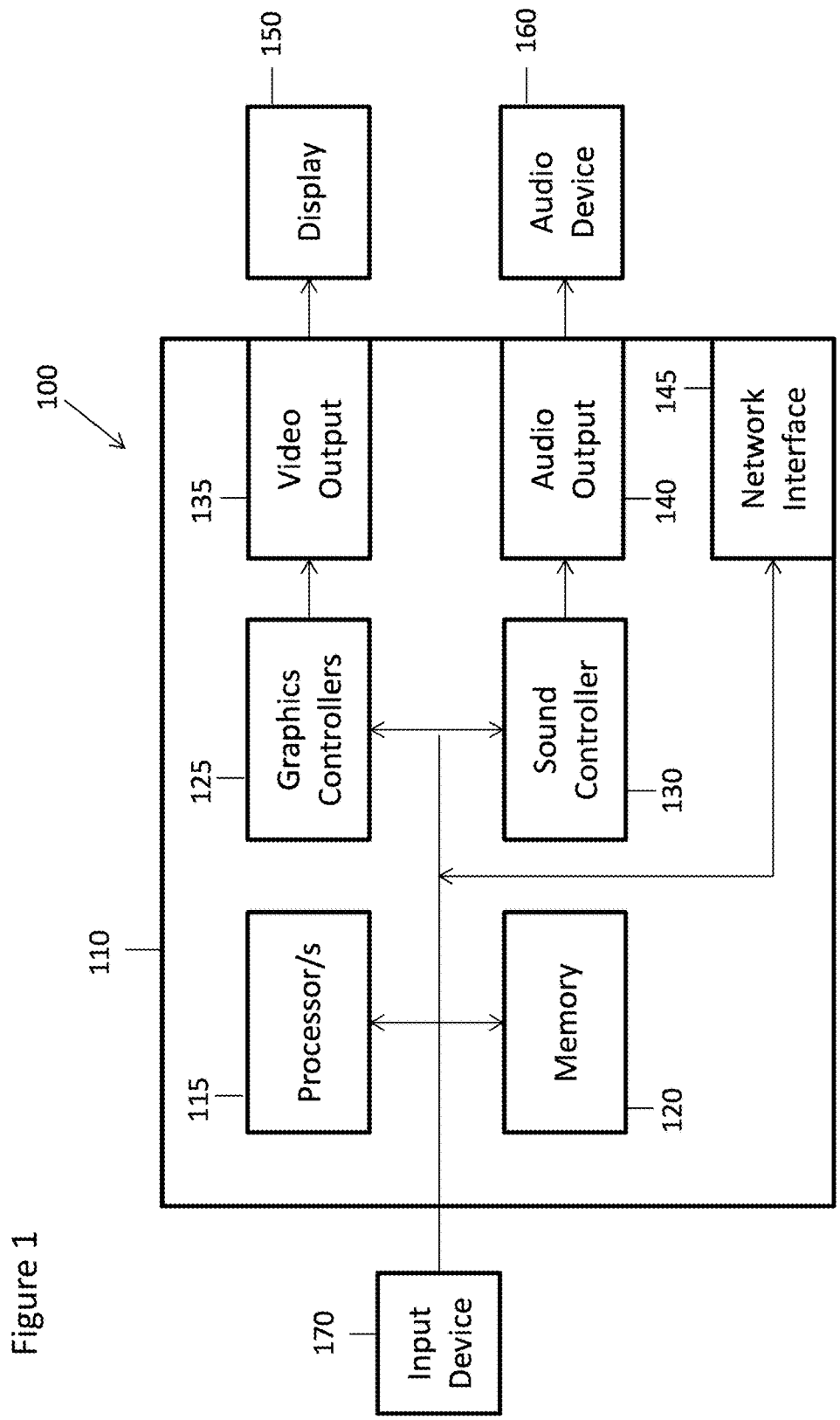
FIG. 1 shows an example device.

A schematic view of a user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The control part 110 has an interface 145 allowing the device to be able to communicate with a network such as the Internet or other communication infrastructure.

The video output 135 is provided to a display 150. The audio output 140 is provided to an audio device 160 such as a speaker and/or earphone(s).

The device 100 has an input device 170. The input device 170 can take any suitable format and can be one or more of a keyboard, mouse, touch screen, joystick, audio input or game controller. It should be appreciated that the display 150 may in some embodiments also provide the input device 170 by way of an integrated touch screen for example.

The blocks of the control part 110 are configured to communicate with each other by an interconnect such as a bus or any other suitable interconnect and/or by point to point communication.

It should be appreciated that in some embodiments, the control part 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

The user device may be in the form of a personal computer, a laptop, a tablet, a mobile phone, a mobile "smartphone", augmented display computing devices, smart jewellery including watches and rings or necklaces that may connect with such user devices, gaming console or portable gaming device, and other typical user devices for business and/or for personal entertainment and media consumption.

Figure 2:
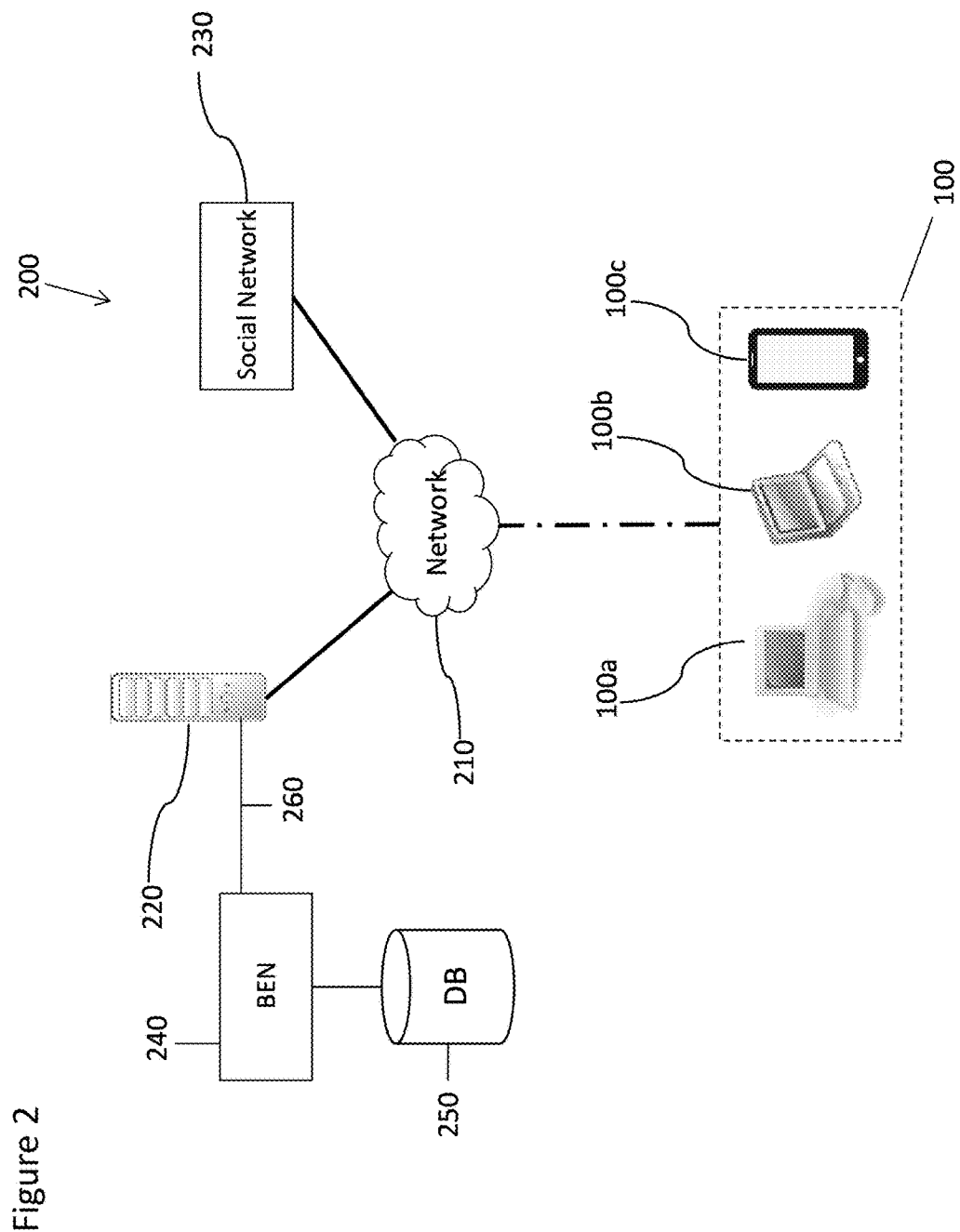
FIG. 2 illustrates an example system configured to communicate with the device.

FIG. 2 schematically shows a system 200 in some embodiments. The system 200 comprises a server 220 which may be in communication with a database 250 via a back end infrastructure 240 ("BEN"). The database may store game player's details, profiles, statistics, etc. In practice, one or more databases 250 may be provided. In some embodiments, the database may be provided in the server 220, or in a server farm, or alternatively or in addition via one or more shards connected with the server 220.

Where more than one server 220 is provided, the database(s) 250 may be provided in one database 250 or across two or more servers 220, 310. The server 220 may also have a games data function. This may comprise one or more units of memory to store the computer game program and user data, and a processor to run the games program and process the user data.

The server 220 may communicate via for instance the internet 210 with one or more client or user devices 100, shown in the figure by way of example as user devices 100*a*, 100*b* and 100*c*, and may further provide connections to a social network 230 such as Facebook™.

It should be appreciated that embodiments may be deployed in different system architectures. For example, the computer game application may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other players. The data which is fed back may also allow scoring and/or cross platform synchronization.

In some embodiments, the game may be implemented as a computer program that is stored in a memory of the system, for example the server 220, and which runs on a processor of the game server. Data streams or updates are supplied to the user device 100 to allow the user device 100 to render and display graphics and sounds in a browser of the user device 100. Such an approach is sometimes referred to as a web services approach. It should be appreciated, however, that such an approach does not necessarily require the use of the Internet.

Figure 3:
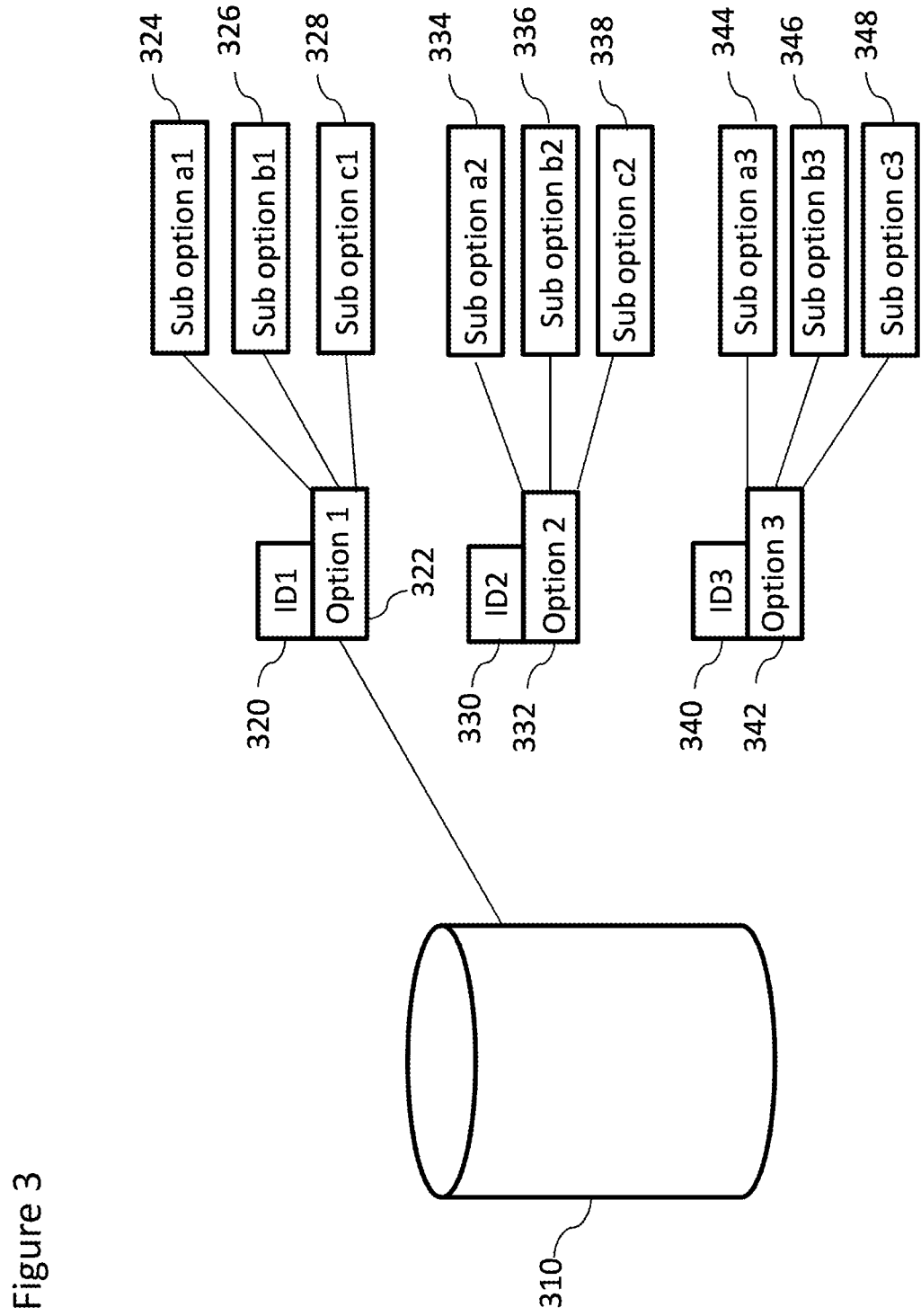
FIG. 3 illustrates features of a database structure with records storing options and sub-options.

FIG. 3 illustrates an example embodiment of the database 250. In this embodiment, database 310 stores records 322, 332, 342 concerning option 1, option 2 and option 3 for a gaming application. Each record 322, 332, 342 is associated with its own respective identifier. Option 1 322 is associated with a first identifier ID1 320. Similarly option 2 332 is associated with its own unique identifier ID2 330, and option 3 342 is associated with its own unique identifier ID3 340. Each option 322, 332, 342 may also be provided with respective associated sub-options.

Each sub option is provided with its own identifier. The sub option may have its own unique identifier or may have one part made up of the identifier of the associated option and a second part which allow the different sub options to be distinguished. It should be appreciated that this example can be extended where a sub option itself has further sub options or different wording possibilities.

It should be appreciated that the sub options may just represent different wording options for a particular option.

It should be appreciated that options and sub-options may be interchangeable, since a sub-option of an option may be associated in turn with another option, or viewed as an option in itself, and so on.

In an embodiment, each option 322, 332, 342 is shown with linked or associated sub-options 324, 326, 328 which are also identified by an identifier. For example, option 1 322 (ID1) is shown in the Figure having three associated sub-options 324, 326, 328, each identified as illustrated for example purposes only in the Figure as "a1", "b1" and "c1" respectively. Option 2 332 (ID2) has associated sub-options "a2" 334, "b2" 336 and "c2" 338. In a similar fashion option 3 342 (ID3) has associated sub-options "a3" 344, "b3" 346 and "c3" 348.

Those skilled in the art will recognise that links with records may be implemented relationally, hierarchical or in any fashion as appropriate given the particular database architecture. Furthermore, additionally or optionally, the number of message options and/or associated sub-options stored in the database may vary according to the gaming application under consideration and appropriate design rules implemented by the application provider.

For example, options may be graphically based to fit in with the theme and form of the gaming application, and may be dynamic or static once provided to the user. Hence characters within the game may be utilised to present such options to the user. The options may be provided on screen before or at the start of a game or level within the gaming application, upon user login, or after completing a level or game portion.

The options 320, 330, 340 may relate to options or offers within a gaming application. In particular, the options may be provided in the context of tournament play, or may be provided in the context of gifts, or the ability to offer a gift to friends or users, or for example may relate to an offer to try a new gaming application.

A tournament game is where a player plays against another player. This may be a real player or a computer generated or NPC (non-playable character) player.

For example, a player or user of the game may receive an option to invite a friend play the game with the player, or the option may relate to a new or different gaming application for offer to the current user or player.

In general, the syntax and context of such options may be determined by, and only limited by the imagination of the designer of the gaming application in question, as will now be described in more detail with reference to FIGS. 4*a*, 4*b* and 4*c*.

FIG. 4*a* illustrates a record 410 comprising three options 430, each identified by a respective identifier 420. The option 420 identified as ID 1 may relate to "play" options or offers 430, with associated sub-options 440 each identified by a respective identifier such as shown in the Figure for clarity and understanding as "a", "b", "c", all associated with the context of "play" option ID 1. For example option "a" may relate to play options such as finding a friend to play with, or any available player or NPC, or a tournament in which to participate.

Options identified under ID 2 may relate to a "gift" context, and the sub-options 440 identified as "d", "e" and "f" may each comprise data relating to that context, such as for example offering a gift in the form of extra lives, a credit bonus or the like.

Similarly, options identified under the context 430 of "invite to try" (ID 3) may comprise sub-options "g", "h" and "i" relating to the invitation to try a new level just released, or a bonus level that is unlocked after certain achievements or reward criteria have been met or achieved, and/or may relate to an invitation to the user 100 to try a new gaming application.

In the context 430 of the various options that may be provided, each sub-option 440 identified by its identifier ("a", "b", "c") may be linked to the primary or main option 420.

Figures 4B, 4C:
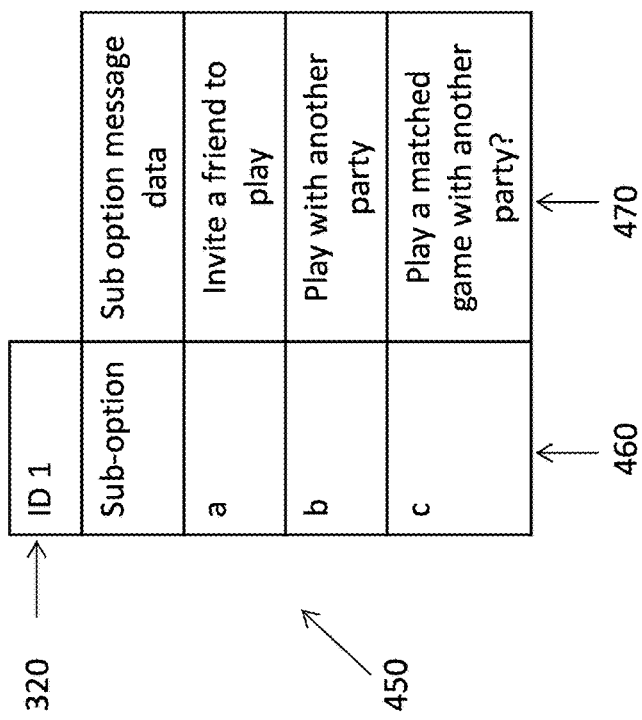

FIG. 4*b* illustrates in another embodiment options within an overall context identified by identifier 320 (ID1 in the table), the context in this example being a tournament or "play" context. Hence options within ID1 comprise options or sub-options "a", "b", "c" 460 with associated message data 470.

FIG. 4c illustrates an embodiment 480 in which each option or sub-option 482 is further provided with a tag 484 to indicate or identify the context of that option or sub-option 482.

Therefore, with reference to the table, in this embodiment the option with identifier "b" comprises message data concerning an option relating to tournament "play" (ID1) in this context against a stranger 484 or a player unknown to the user.

The option with identifier "a" comprises message data concerning an option relating to tournament "play" (ID1) in this context against a friend or a player 484 known to the user.

The friends may be provided by for example a social network 230, and may be provided by a suitable friend identifier of a friend list supplied by the user to the system as an email address or a username.

The option "c" relates to message data for a match or matched 484 tournament play. This provides an option for a player to play against other players who may or may not be known to the player but are of a similar skill level, or at the same level in the gaming application and available for participation. Such an option may be on the same social network 230 as the user and a link is made through that platform, or the system provider may provide its own networked platform specifically for hosting gaming applications, tournaments and the like such as the "kingdom" provided by applicant at king.com for example, for which interested users may register with an email address to form an account.

In another embodiment the sub-options may be the same option but each sub-option has differing or alternative wording. In some embodiments, this may be used in combination with the previously described embodiments. The different wording again will be tagged or identified so as to be distinguished from each other.

Hence a single option "play against a friend" may have sub-options for the same context and if chosen or selected by a user would invoke the same effect, whilst each sub-option provides message data presented to the user that provides in effect the same end result but is worded in a different way.

The number of options/sub-options may be more or less than three. There may be no sub-options associated with an option for example, depending on the context of the offer that the service provider wishes to present. Different options may be provided with differing numbers of sub options.

Hence a pool of options and/or sub-options across contexts or within a context, with associated sub-options are provided and maintained, wherein each context, option and sub-option may be tracked and identified by its unique identifier or identifier chain, per gaming application.

Each option and/or sub-option is further provided with a weighting parameter as will now be described with reference to FIGS. 5 to 8 to aid the selection, provision and analysis thereto to a user device 100.

Figure 5:
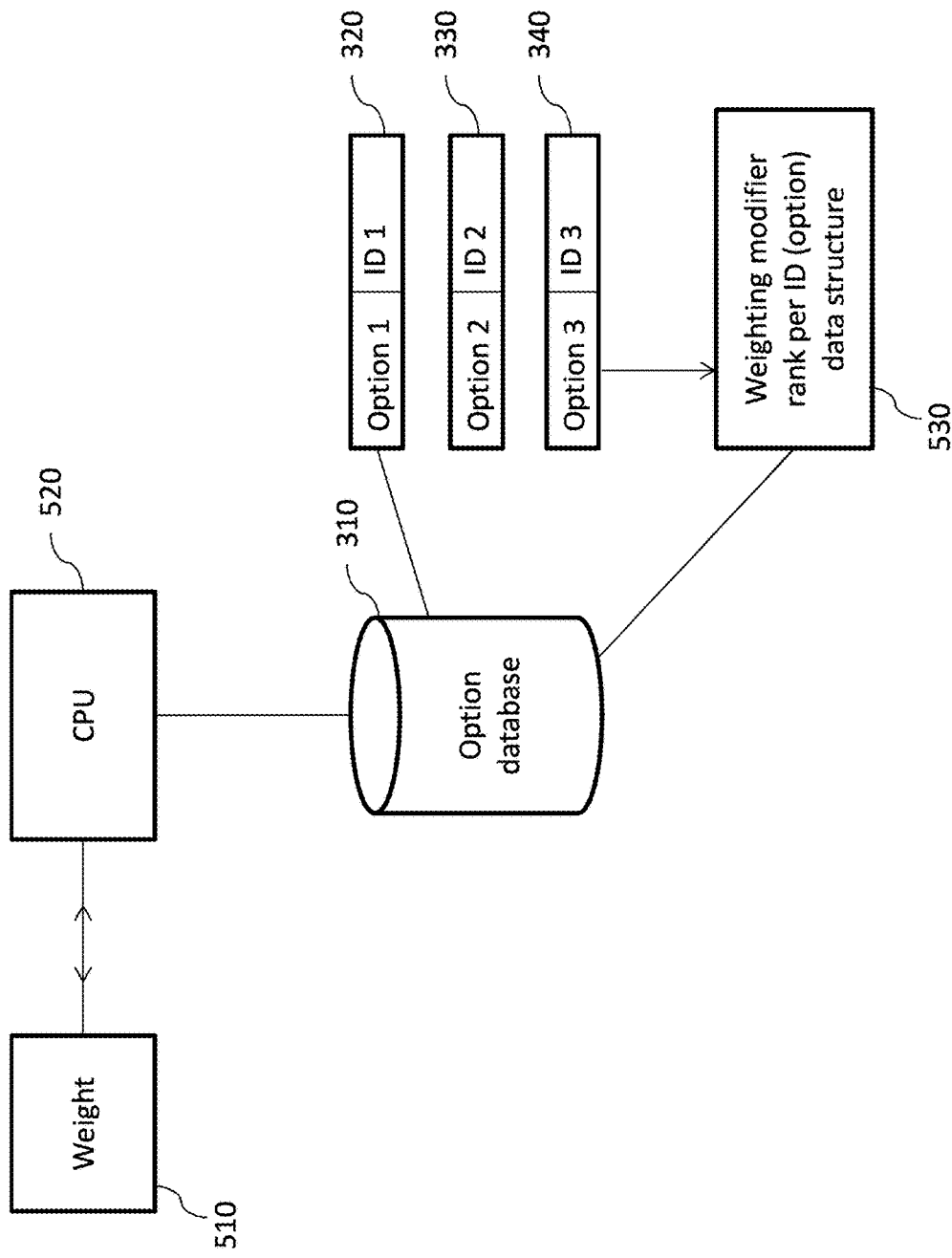
FIG. 5 depicts an embodiment of a system.

FIG. 5 shows an example schematic of an embodiment illustrating components arranged to rank and/or weight various options and sub-options based on user feedback and analysis.

A processor 520 is provided which may be based in a server or backend infrastructure of the application provider. The processor 520 is connected to a weighting module 510 which may be implemented by the processor 520 in some embodiments, or which may be implemented in software, hardware, or a combination of both in some embodiments as will be recognised by those skilled in the art.

The processor 520 is provided with communication to the option database 310 comprising option records 320, 330, 340 with associated identifiers as described previously. Furthermore, each option or sub-option of an option may be provided with information. The information may take any suitable form and may be a weighting parameter and/or a modifier or ranking parameter. The parameters may be stored separately in the database 310 or may be stored alternatively or in addition in another database of the backend infrastructure accessible by processor 520.

The information may be stored together with information about the option/sub options and its identifier or tag.

Alternatively, in another embodiment processor 520 may calculate the parameter per option/sub-option when the option or sub-option is to be considered for offer to a user.

In some embodiments, when offered to a user the user device 100 selects the option to offer based on the weight of a particular option. In some embodiments, the selection algorithm will select those options with a higher weight more often than those with a lower weight. It should be appreciated that options with a lower weight may continue to be selected as in some embodiments it is desirable to vary the output. In other embodiments, options which have a relatively low weight may not be selected.

In some embodiments, the weighting is used to control the order in which one or more options and/or sub options are presented to a user.

In some embodiments, the weighting is used to control if one or more of the options and/or sub options are displayed more prominently.

The weighting module in some embodiments comprises a weighting algorithm in which a user history and count of positive selections of options/sub-options by a user is taken into account by the weighting module.

In another embodiment, in addition to the particular user history, other user histories or counts may be taken into account.

In another embodiment, statistical data (so called "big data") analyses based on many users may also be used to inform the weight, to improve user satisfaction as will become clear hereinafter.

Hence positive feedback of options preferred by users is provided to the game application provider allowing tracking via the identifier of each option and enabling statistical analysis and design of improved new options. For example, in an embodiment, the exact message data such as the wording of the option or sub-options may be compared and analysed to provide engagement of the users.

Figure 6:
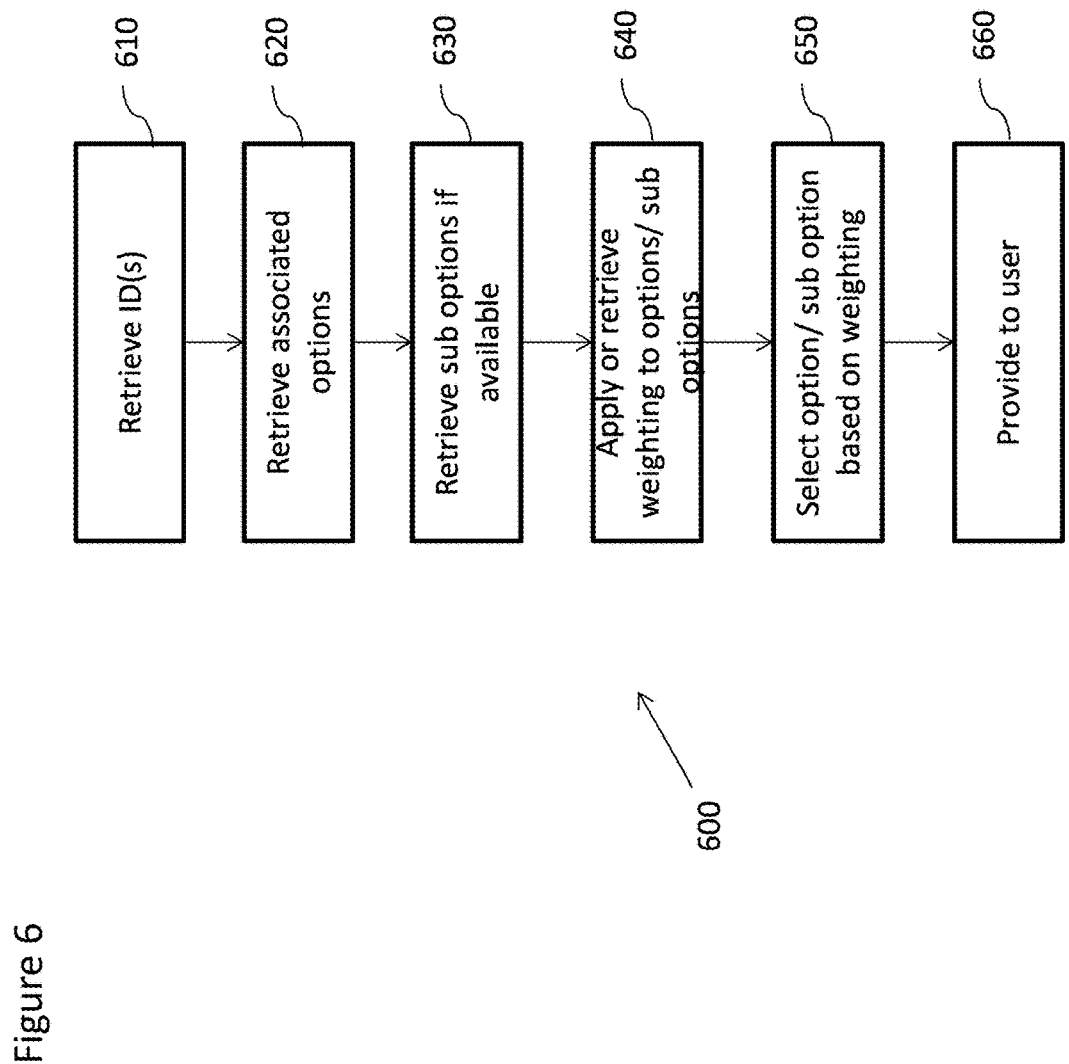
FIG. 6 is a flowchart illustrating steps in a method for selecting options according to an embodiment.

FIG. 6 illustrates steps in an embodiment of a process for selecting which options to provide based on the identifier and weighting. The processor 220, 520 at step 610 retrieves one or more identifiers 320, 330, 340 for an option from the database or storage 250, 310. Depending on the stage in the game, one or more options may be appropriate.

This may be triggered by the user reaching a particular level or stage in the gaming application for example, or may be triggered by the user achieving certain markers or rewards within the gaming application.

Subsequently the option 322, 332, 342 associated with the identifier 320, 330, 340 is retrieved at step 620 from the database or storage 250, 310.

Optionally, any sub-options 324, 326, 328 linked to the one or more options 310 are also retrieved if appropriate at step 630.

Processor 220, 520 then at step 640 applies a weighting calculated and supplied by weighting module 510 to the option, or optionally in another embodiment may retrieve a weighting 530 previously calculated and associated with the option and stored 310.

At step 650 the processor 220, 520 selects the option and any required sub-option based on the weighting and provides that option for the user device 100.

This may be used to select the messaging to use. It should be appreciated that each different wording for a given option or sub option may have its own weighting.

In another embodiment the weighting parameter may be determined randomly in situations, and subsequently modified as described above upon selection of the option by the user device (where for example blind tests of the options in a new community may be required).

Figure 7:
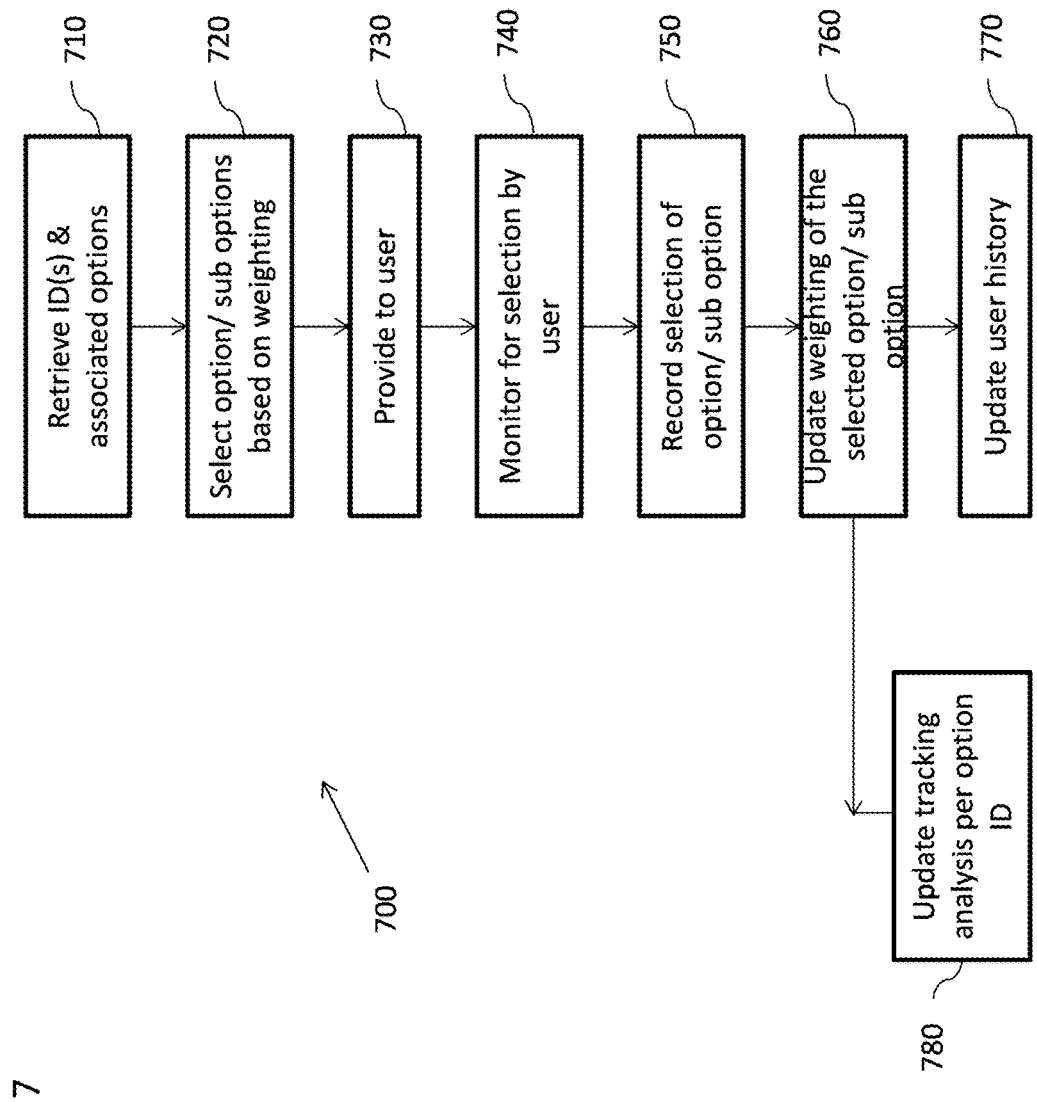
FIG. 7 is a flowchart illustrating steps in a method for updating weighting of options and tracking according to an embodiment.
Figure 8:
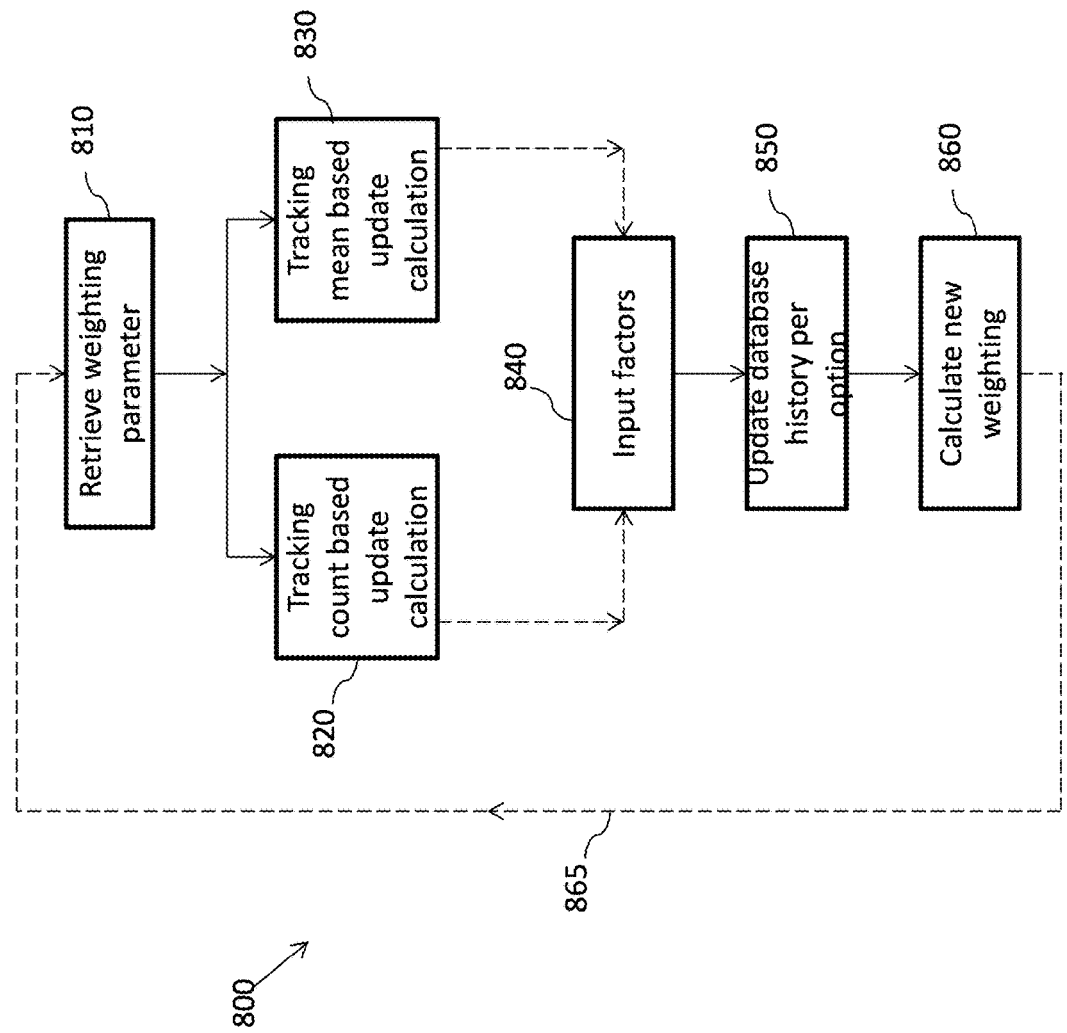
FIG. 8 is a flow diagram illustrating an embodiment for tracking and statistical analysis according to an embodiment.

FIG. 7 and FIG. 8 illustrate steps in method embodiments 700, 800 providing updates or modifications to the weighting parameter for an option and/or associated sub-option.

With reference to FIG. 7, at step 710 the processor 220, 520 retrieves one or more identifiers 320, 330, 340 for one or more options and any associated sub-options from the database or storage 250, 310.

At step 720 the processor 220, 520 selects an option and sub-option if appropriate based on the weighting and provides that option for the user device 100 at step 730.

At step 740 a selection of an option and/or sub-option by the user device 100 is subsequently monitored for and the selection recorded at step 750 by for example storing a flag indicating the selection or updating a counter or the like. Time stamps may also be recorded to enable further analysis as will be described below.

At step 760 the weighting parameter for the option and/or sub-option selected is updated in the database 250 by processor 520 in communication with the weighting module 510.

At step 770 the application provider updates a stored user history for the user, and optionally updates data recording the selection of the option for tracking analysis per option identifier at step 780.

FIG. 8 is a flow chart 800 depicting some example embodiments for tracking and statistical analysis and feedback to the weighting parameter via for example the system of FIG. 5.

In step 810 the weighting parameter associated with the option and/or sub-option identifier is retrieved from the database 310.

Processor 520 may then perform a tracking based calculation or count update to compare the selection of the option associated with the identifier with other options. This could be for example a simple count of selections as indicated by step 820 or may involve an averaging algorithm to determine the mean rate of selections per option and/or sub-option.

Various input factors as recognised by those skilled in the art may also be input at step 840. For example one or more of geography, word count per option, number of graphics or icons presented as part of the option message data may be recorded to allow both statistical analysis of the one or more factors that influence the selection of an option/sub option, or modelling of results to provide future guidelines on option design.

The analysis may be carried out on the basis of the unique identifiers associated with each option/sub options.

This may provide a "blind" trial approach that avoids or mitigates any views of the designer or analyst performing the tracking.

Once analysed, the stored history per option may be updated at step 850 and subsequently used by the weighting module 510 to update the weighting of an option at step 860.

Hence, those options or sub-options which show a prevalence for selection may be weighted to reflect that prevalence automatically, as indicated by feedback path 865, such that options and sub-options from a pool of potential options, each identified by its identifier, and showing increased user engagement and selection may be automatically provided.

Alternatively, those options and sub-options which show a poor response may be analysed per identifier and appropriately weighted so as to decrease a chance of selection for provision by processor 520, or may be removed altogether.

Figure 10:
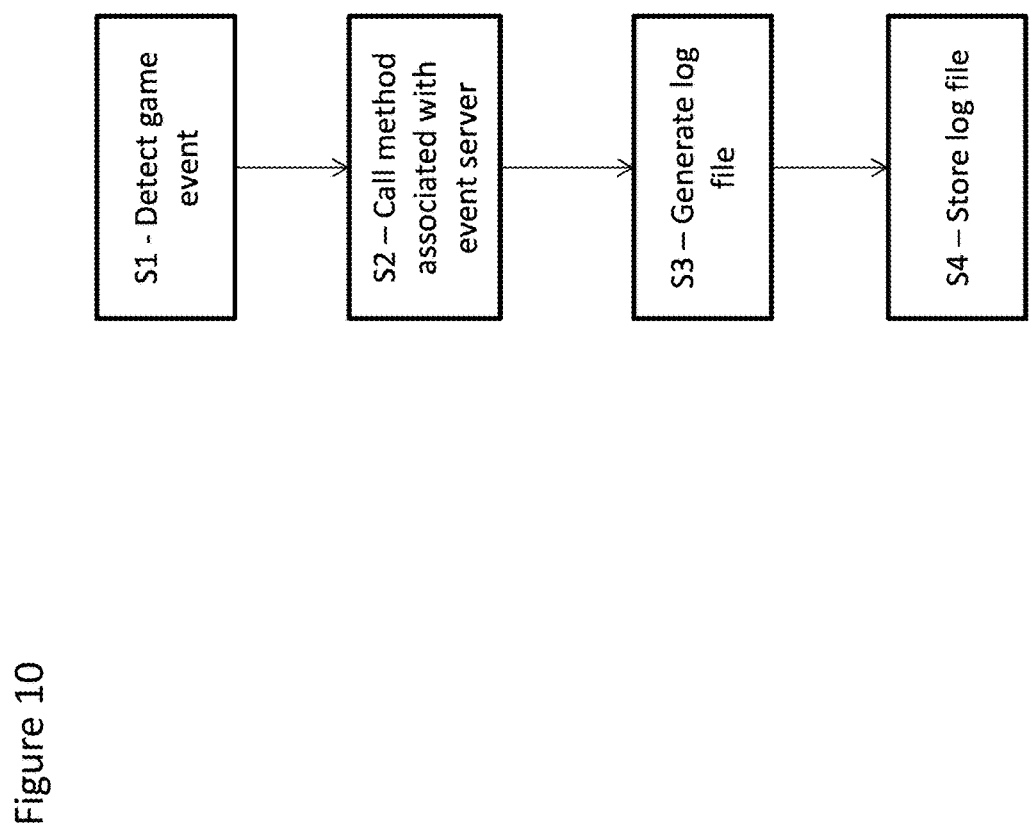
FIG. 10 shows a method for providing information to a server system.

Reference is made to FIG. 10 which shows a method which may be used to track the selection of options/options. In step S1, on a client device, a particular option and/or sub option is selected. This may be detected or determined in the client device, by for example one or more of the processors 115, in dependence on the user input In response to the selection of this game option, in step S2, a call will be made by the client device to a method associated with the selected option.

The method may be stored on the server side or the user device side.

A method can be regard as a code block that contains a series of statements. A program causes the statements to be executed by calling the method and specifying any required method arguments. When a method is called, information is passed to the method for it to use. These actual arguments may be inside parentheses following the method name. In some embodiments, commas are used to separate arguments if there is more than one. The call may include one or more parameter values which may be associated with the selection.

One or more of the identifiers associated with the selection may alternatively or additionally be separately provided to the game server.

In step S3, the call to the method may cause the server (and/or user device) to generate a log file. The log file may be in any suitable format and in some embodiments is in the form of a text file. The log file will have a predetermined format, defined by the called method. The log file will include information relating to which option/sub options has been selected. The information may comprise the identifier or tags associated with the selected option/sub option. In some embodiments, identifiers or tags may be provided for options/sub options which are not selected but which have been presented to the user.

In step S4 the log file is then stored in a data store.

In some embodiments, a particular game event may detected which cause a method to be called, the method being associated with the game event. The log file which is generated will include the information relating to which option/sub options has been selected. The information may comprise the identifier or tags associated with the selected option/sub option. In some embodiments, identifiers or tags may be provided for options/sub options which are not selected but which have been presented to the user.

Figure 11:
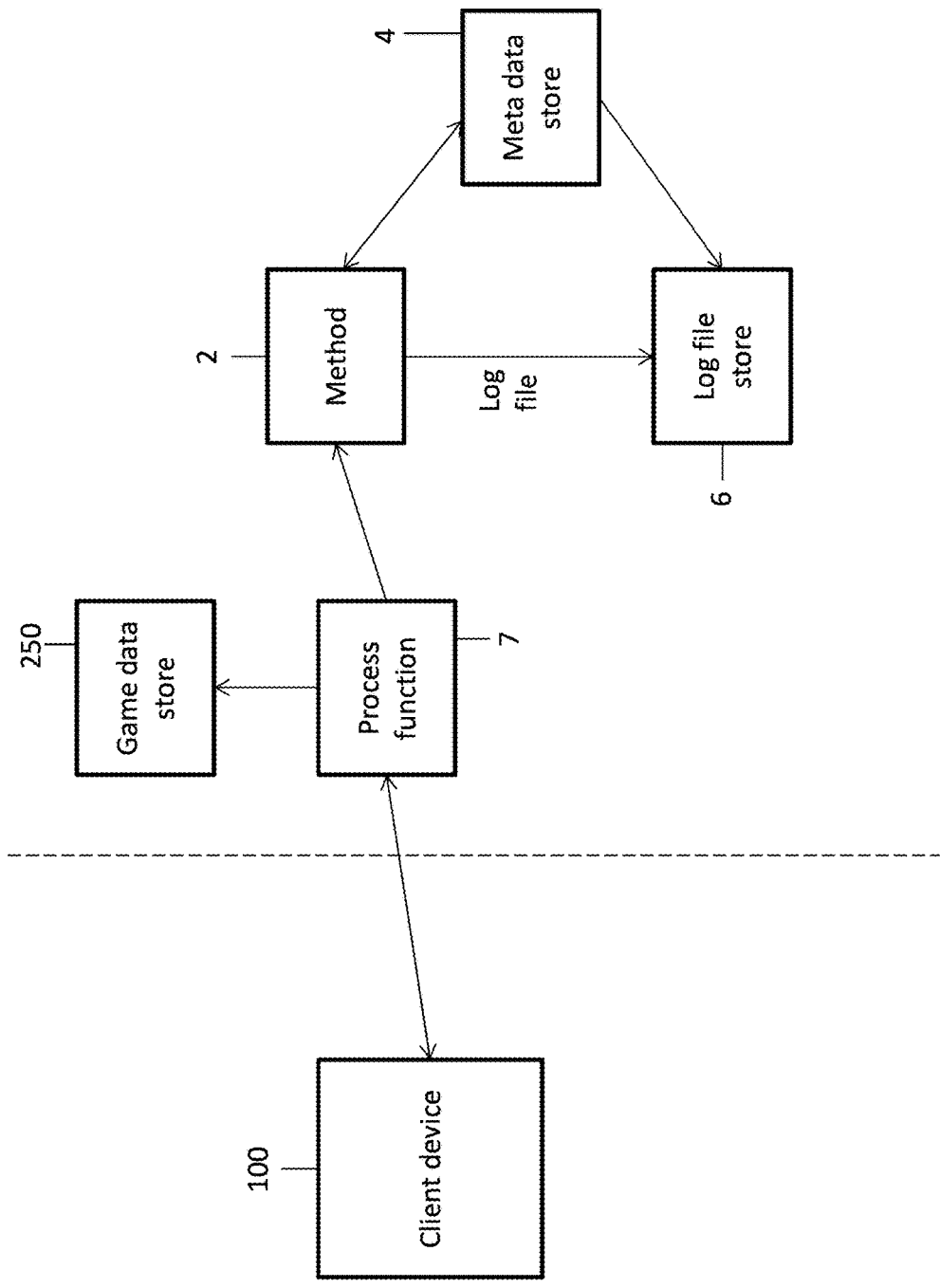
FIG. 11 schematically shows a server system for collecting data on selection of options and sub options.

Reference is made to FIG. 11 which shows a system for performing the method of FIG. 10. It should be appreciated that FIG. 11 is schematic and shows some of the functions provided on the server side. The physical entities which provide these functions may be any one or more suitable entities. The client device 100 (which may be as discussed in relation to FIG. 1) will allow the user to play the game. The client device will determine when a particular selection occurs and cause the client device to make a call to the method 2 which is on the server side. A process function 7 which may be provided by a server or the like will receive the call. The call is then directed to the method 2 by the process function. The method 2 may be on the same server as the process function or a different server to the process function. The server side also has the game data store 250 which stores a user's data, such as progress data or the like. Data for the game data store 250 may be received by the process function and directed to the game data store. In response to the invoking of the method 2, a log file is generated and in stored in a log file store 6. Any suitable data store 6 may be used to store the log file data 6, which may be the form of text files, as discussed above.

Meta data may provide a key to the data stored in the log files in the log file store. This will define for each of the game event identifiers, the format of the information stored in the log file. A separate store 4 can be provided for this metadata. This metadata store 4 can be used to determine how to parse the stored log files and allows new queries to be formulated easily. Analytics for the data can be determined by using the information in the metadata store to form queries which can then be used to parse the data store which has the text data files.

The log file store will have information on which options/sub options are selected/not selected and can be used to provide or update the weighting information as described previously.

It should be appreciated that the data in the log file may be provided by the client device. This data may be some of the data to be stored in the game data store and/or may be provided specifically for the log file. The server side may provide data such as for example time stamp information or the like.

It should be appreciated that embodiments may be used with any suitable game event. The game event may be the completion of a level, the start of a game, the ending of a game, purchasing of a particular item, interaction with one or more friend, a particular score or the like.

Figure 9:
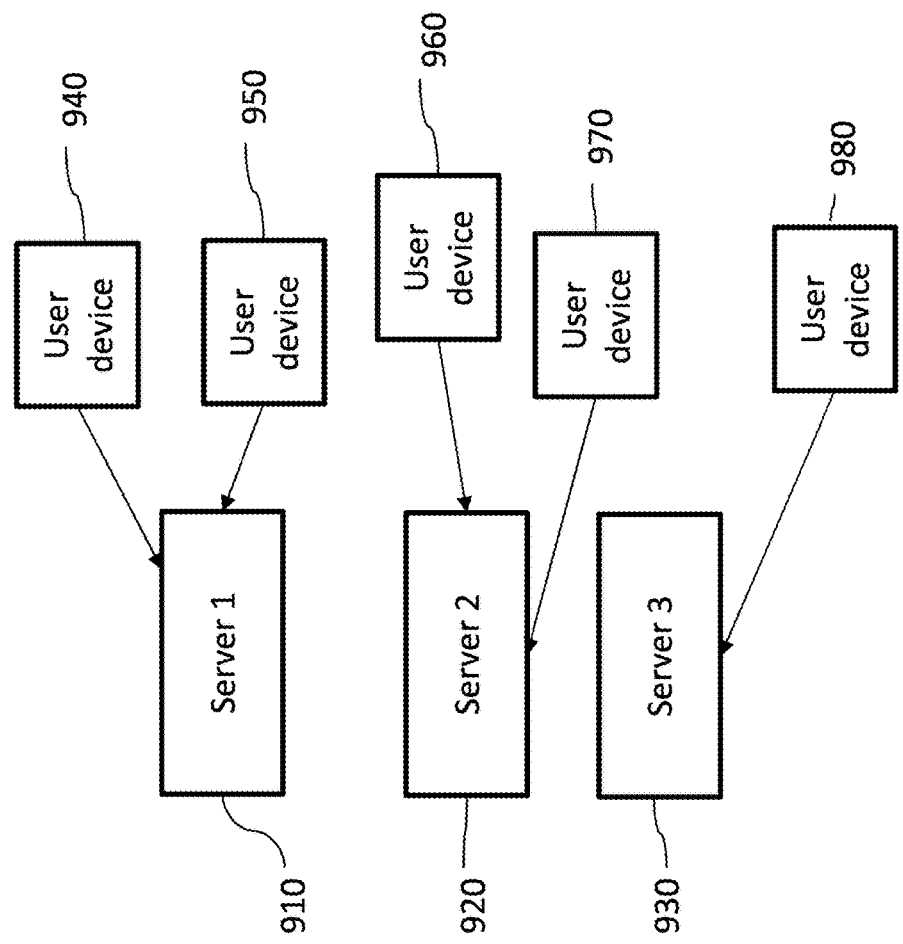
FIG. 9 shows a server and user device arrangement for use in some embodiments.

FIG. 9 schematically illustrates an embodiment in which users are matched in dependence on being served by the same server within the network for tournament play thereby reducing data traffic to the database 250, 520.

FIG. 9 shows multiple server devices 910, 920, 930. These servers may provide the options as described above for user selection. User devices 940 and 950 are shown in connection with server 1 910. User devices 960 and 970 are shown in connection with server 2 920. User device 980 is shown in connection with server 3 930. It will be recognised that many more servers 910, 920, 930 and user devices 940, 950, 960 may be provided, and is not limited by the example herein.

Each server will have information as to those user devices which are associated therewith. It should be appreciated that in some embodiments, a user device may not be associated with the same user device for all sessions. The same user device may in different sessions be associated with different servers.

The server 910 selects at least one second user device 950 to which it is connected for interaction with a first user device, also associated with that server, providing a more reliable connection which may improve user satisfaction. The second user device is selected as a potential candidate to play a game against or otherwise interact with the first user device. The second user device may be selected from the available user devices associated with that server.

The server may select a plurality of user devices, associated with that server, with which the first user device potentially is able to interact. The server may send information to the first user device, also associated with that server. This information may be used by the first user device to display a list of potential opponents with which the user of the first device is able to interact. The user of the first device may select one or more of these second user devices to interact with.

In some embodiments, the server will select a user device with which the first user device is to play or interact with. This may be based on similar gaming abilities, availability, activity, similar profiles, similar location, being friends on a social network or in any other suitable way.

In another embodiment, the server also measures the latency of communication between it and user devices connected thereto, and matches the first user device with the user device having the lowest measured latency or "ping".

A person skilled in the art will realise that the different approaches to implementing the systems, devices and methods comprising game option selection, provision and analysis are not exhaustive, and what is described herein are certain embodiments. It is possible to implement these in a number of variations without departing from the spirit or scope of the invention.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A computer system comprising:
   at least one memory storing one or more in-game options and a plurality of in-game sub-options for a computer implemented game, each in-game option having a respective identifier and a respective weight and at least one in-game option being associated with at least two further in-game sub options, each of the in-game sub options having a respective identifier and a respective weight;
   at least one processor configured to select and retrieve from the at least one memory, based on the respective weight, one or more of: one or more in-game options and one or more in-game sub options;
   a display device configured to display the selected and retrieved one or more of the one or more in-game options and the one or more in-game sub options in the computer implemented game as one or more user selectable options; and
   an input device configured to receive user input to select one or more of the displayed user selectable options,
   wherein the at least one processor is configured to provide the in-game option or in-game sub option associated with the user selected option in said computer game,
   wherein a respective weight provides a weighting for a respective in-game option or in-game sub option in dependence on previous selections thereof, identified by the respective identifier, by one or more users playing the computer implemented game via one or more user devices.

2. A computer system as claimed in claim 1, wherein the memory is configured to store the identifier of an in-game option in association with respective identifiers of the respective plurality of in-game sub options associated with that in-game option.

3. A computer system as claimed in claim 1, wherein at least some of the in-game sub options comprise message data associated with a respective option for display on said display device.

4. A computer system as claimed in claim 1, wherein the at least one processor is configured to use the weight to control displaying of information associated with a plurality of in-game options.

5. A computer system as claimed in claim 1, wherein the input device and the display device are provided by a touch screen.

6. A computer system comprising:
   at least one database storing a plurality of in-game options and a plurality of in-game sub-options for a computer implemented game, each in-game option having respective identifying information and a respective weight, and at least one in-game option being associated with at least two further in-game sub options, each of the in-game sub options having a respective identifier and a respective weight, said weights being used to determine which one or more of one or more in-game options and one or more in-game sub options is to be provided as a user selectable option when said computer implemented game is played on a user device;
   at least one processor configured to receive selection information from a plurality of user devices, the selection information having the respective identification information indicating which one of the plurality of in-game options and said plurality of in-game sub options have been selected by a user of a respective user device by the user selecting the user selectable option associated with a respective in-game option or in-game sub option, said at least one processor configured to use said received selection information to determine the weight for a respective in-game option or in-game sub option.

7. A method for providing a computer implemented game in a user device, the method comprising:
   storing in at least one memory one or more in-game options and a plurality of in-game sub-options for a computer implemented game, each in-game option being associated with a user selectable option, each in-game option having a respective identifier and a respective weight and at least one in-game option being associated with at least two further in-game sub options, each of the in-game sub options having a respective identifier and a respective weight;
   selecting and retrieving, by at least one processor, from the at least one memory based on a respective weight, one or more of: one or more of the in-game options and one or more of the in-game sub options,
   displaying on a display device the selected and retrieved one or more of the one or more in-game options and the one or more in-game sub options in the computer implemented game as one or more user selectable options;
   receiving user input, via an input device, selecting one or more of the displayed user selectable options;
   providing, by the at least processor, the in-game option or in-game sub option associated with the user selected option in said computer game,
   wherein a respective weight provides a weighting for each in-game option or in-game sub option in dependence on previous selections thereof, identified by the respective identifier, by one or more users playing the computer implemented game via one or more user devices.

8. A computer implemented method as claimed in claim 7, comprising storing in the at least one memory the identifier of an in-game option in association with respective identifiers of the respective plurality of in-game sub options associated with that in-game option.

9. A computer implemented method as claimed in claim 7, wherein at least some of the in-game sub options comprise message data associated with a respective in-game option for display on said display device.

10. A computer implemented method as claimed in claim 7, comprising using the weight to control displaying of information associated with a plurality of in-game options.

11. A method for providing a computer implemented game in a user device, the method comprising
   storing a plurality of in-game options and a plurality of in-game sub-options for a computer implemented game, each in-game option having respective identifying information and a respective weight, and at least one in-game option being associated with at least two further in-game sub options, each of the in-game sub options having a respective identifier and a respective weight, said weights being used to determine which one or more or one or more in-game options and one or more in-game sub options is to be provided as a user selectable option when the computer implemented game is played on a user device;
   receiving selection information from a plurality of user devices, the selection information having the respective identification information indicating which one of the plurality of in-game options and the plurality of in-game sub options have been selected by a user of a respective user device by the user selecting the user selectable option associated with the respective in-game option or in-game sub option;

using the selection information to determine the weight for a respective in-game option or in-game sub option; and storing the determined weight for the respective in-game option or in-game sub option.

* * * * *